(No Model.)
E. OVER.
SOIL PULVERIZER AND ROLLER.
No. 500,418.  Patented June 27, 1893.
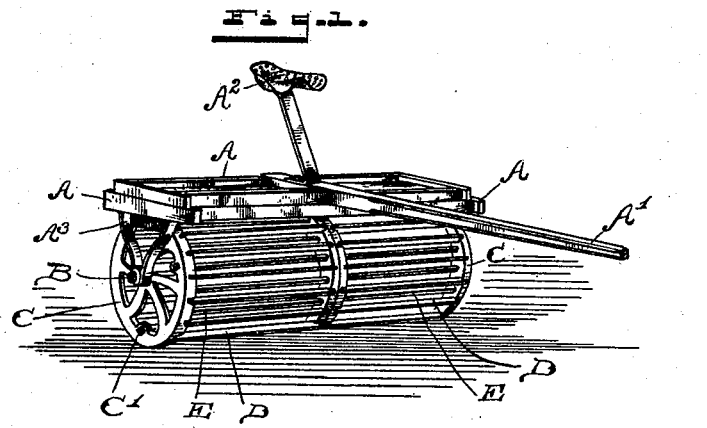
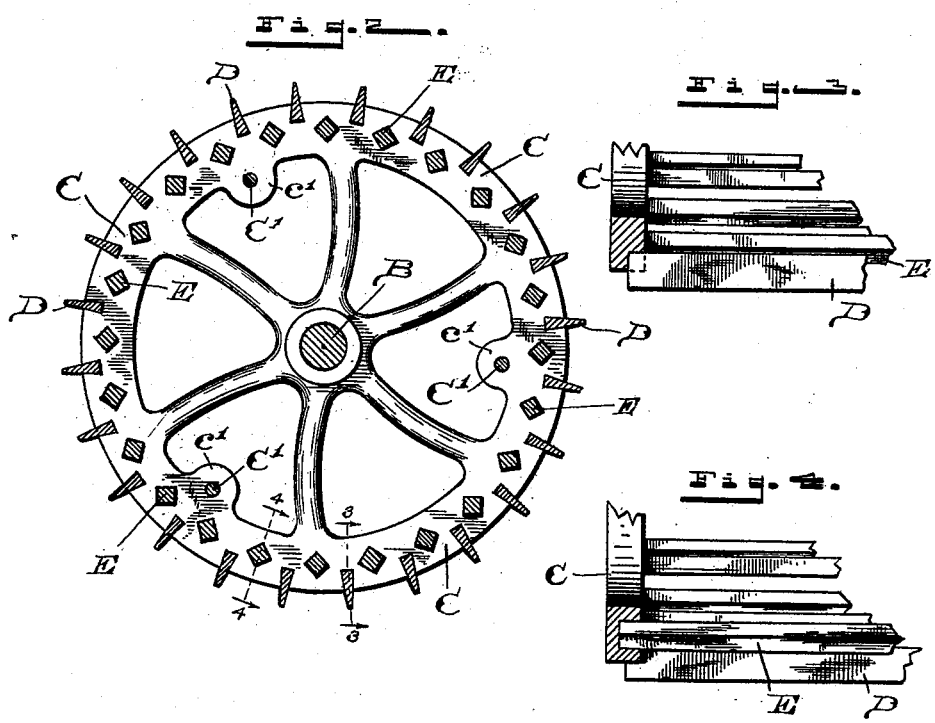
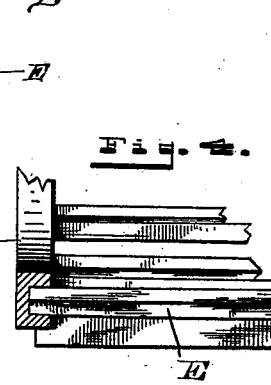
WITNESSES:
F. W. Warner
J. A. Walsh
INVENTOR
Ewald Over,
per Chester Bradford,
ATTORNEY

UNITED STATES PATENT OFFICE.

EWALD OVER, OF INDIANAPOLIS, INDIANA.

SOIL PULVERIZER AND ROLLER.

SPECIFICATION forming part of Letters Patent No. 500,418, dated June 27, 1893.

Application filed December 1, 1892. Serial No. 453,743. (No model.)

*To all whom it may concern:*

Be it known that I, EWALD OVER, a citizen of the United States, residing at Indianapolis, in the county of Marion and State of Indiana, have invented certain new and useful Improvements in Soil Pulverizers and Rollers, of which the following is a specification.

My said invention relates to that class of devices which are used to cut clods and generally pulverize and level ground for agricultural purposes; and it consists in certain details of construction whereby an efficient implement is produced, as will be hereinafter more particularly described and claimed.

Referring to the accompanying drawings, which are made a part hereof, and on which similar letters of reference indicate similar parts, Figure 1 is a perspective view of the complete implement set up in condition for use; Fig. 2 a transverse sectional view of the roller, on an enlarged scale; and Figs. 3 and 4 detail views, respectively, on the dotted lines 3 3 and 4 4 in Fig. 2.

In said drawings the portions marked A represent the frame-work of my improved pulverizer and roller; B the axle thereto; C the heads to the roller; D the cutting bars; and E the crushing or pulverizing bars.

The frame-work A is of a substantially rectangular form, and to it is secured a tongue A' to which the animals are attached, a seat A² upon which the driver may be seated, and hangers A³ which support the axle to the roller. The axle B is mounted in bearings in the hangers A³ and extends through the roller or rollers. (Two rollers are shown in Fig. 1.) The heads C have sockets and mortises for the bars D and E, and are connected together and clamped against said bars by rods C'', which pass through ears c' provided therefor, as shown. The cutting bars D are wedge-shaped in form, with their sharp points to the outside, and the ends are seated in dovetailed sockets in the rims of the heads C, and are thus held firmly therein, when said heads are clamped toward each other by the bolts C', as will be readily understood. The outer sharp edges, projecting beyond the rims of the rollers, serve effectually to cut the large and hard clods over which the implement may pass.

The pulverizing and crushing bars E are usually square bars, (they may have a different number of sides if desired) the ends of which enter mortises in the rims of the heads C, said mortises being arranged so that the corners of the bars shall be presented outwardly, whereby said bars are enabled to have something of a cutting as well as pulverizing and leveling effect, as the implement passes over the ground. The ends being mounted in the mortises, they are held securely in that position, in the same manner that the bars D are held, by the clamping of the bolts C'. These bars E being square, can, by simply loosening the bolts C', be turned so as to present a fresh edge to wear whenever the one in use has become dulled.

I have shown and prefer to make the rollers of my improved machine wholly of iron or steel, but I may, of course, make the same partly of wood and partly of metal, and may vary the form somewhat, without departing from my invention.

Having thus fully described my said invention, what I claim as new, and desire to secure by Letters Patent, is—

1. The combination, in a soil pulverizer and roller, of the heads C having mortises or cavities in their outer flanges or rims facing each other, crushing bars E mounted in said mortises and extending from one head to the other, and cutting bars D mounted also in said heads alternately with said crushing bars and projecting beyond said crushing bars, and bolts passing through the heads and securing the structure together, the whole being arranged and operating substantially as shown and described.

2. The combination, in a soil pulverizer and roller, of the heads, and cutting and crushing bars extending between said heads and arranged alternately, the cutting bars projecting beyond the operating line of the crushing bars, substantially as shown and described.

3. The combination, in a soil pulverizer and roller, of the heads, square crushing bars mounted in mortises in said heads, and sharper wedge-shaped cutting bars also mounted in said heads and projecting beyond the rims thereof, substantially as shown and described.

In witness whereof I have hereunto set my hand and seal, at Indianapolis, Indiana, this 28th day of November, A. D. 1892.

EWALD OVER. [L. S.]

Witnesses:
CHESTER BRADFORD,
JAMES A. WALSH.